United States Patent
Haddad et al.

(10) Patent No.: US 8,751,614 B2
(45) Date of Patent: Jun. 10, 2014

(54) PROVIDING VIRTUALIZED VISIBILITY THROUGH ROUTERS

(75) Inventors: Wassim Haddad, San Jose, CA (US); Joel Halpern, Leesburg, VA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 64 days.

(21) Appl. No.: 13/271,047

(22) Filed: Oct. 11, 2011

(65) Prior Publication Data

US 2013/0091254 A1    Apr. 11, 2013

(51) Int. Cl.
*G06F 15/173* (2006.01)

(52) U.S. Cl.
USPC .......................................... 709/220; 709/242

(58) Field of Classification Search
USPC ........................... 709/220–222, 242; 370/331
See application file for complete search history.

(56) References Cited

U.S. PATENT DOCUMENTS

| | | | |
|---|---|---|---|
| 6,631,416 B2 | 10/2003 | Bendinelli et al. | |
| 7,675,923 B2 | 3/2010 | Rossi et al. | |
| 7,729,365 B2 | 6/2010 | Motegi et al. | |
| 7,801,039 B2 | 9/2010 | Monette et al. | |
| 8,045,570 B2 | 10/2011 | Allan et al. | |
| 8,230,050 B1 | 7/2012 | Brandwine et al. | |
| 2004/0117339 A1* | 6/2004 | Thubert et al. ................... 707/1 |
| 2004/0148439 A1 | 7/2004 | Harvey et al. | |
| 2005/0020265 A1* | 1/2005 | Funabiki et al. ............. 455/436 |
| 2005/0086371 A1 | 4/2005 | Jung | |
| 2006/0120386 A1 | 6/2006 | Rossi et al. | |
| 2006/0184645 A1 | 8/2006 | Monette et al. | |
| 2007/0064653 A1* | 3/2007 | Jang et al. ..................... 370/331 |
| 2007/0160050 A1* | 7/2007 | Wang ............................. 370/392 |
| 2008/0013554 A1 | 1/2008 | Motegi et al. | |
| 2008/0181240 A1 | 7/2008 | Jiang et al. | |
| 2008/0192695 A1* | 8/2008 | Krishnan et al. ............. 370/331 |
| 2008/0256458 A1 | 10/2008 | Aldre et al. | |
| 2008/0316974 A1* | 12/2008 | Krishnan et al. ............. 370/331 |

(Continued)

FOREIGN PATENT DOCUMENTS

| EP | 1562390 | 8/2005 |
|---|---|---|
| WO | WO-2009030282 | 3/2009 |

OTHER PUBLICATIONS

Troan et al. RFC 3633—IPv6 Prefix Options for Dynamic Host Configuration Protocol (DHCP) version 6, Dec. 2003.*

(Continued)

*Primary Examiner* — Carl Colin
*Assistant Examiner* — Don Zhoa
(74) *Attorney, Agent, or Firm* — Blakely, Sokoloff, Taylor & Zafman LLP

(57) ABSTRACT

A method implemented by a network element to track IPv6 addresses of devices in a home network, wherein the network element provides DHCPv6 service to the home network and a home network router on the home network assigns IPv6 address to the devices using a prefix provided by the DHCPv6 service, the method including receiving a DHCPv6 request for a prefix delegation from a home network router, sending a DHCPv6 message including an assigned prefix to the home network router, the DHCPv6 message including a request for notification of configured IPv6 addresses, receiving a first ICMP message from the home network router, including a MAC address and corresponding IPv6 address for a configured device, and sending the home network router a second ICMP message to acknowledge recording the IPv6 address for the configured device, enabling the network element to provide services and forward traffic directly to the configured device.

10 Claims, 4 Drawing Sheets

(56) References Cited

U.S. PATENT DOCUMENTS

| | | |
|---|---|---|
| 2009/0047016 A1 | 2/2009 | Bernard et al. |
| 2009/0055900 A1 | 2/2009 | Gopalasetty et al. |
| 2010/0080238 A1 | 4/2010 | Alla et al. |
| 2010/0186079 A1 | 7/2010 | Nice et al. |
| 2011/0040858 A1* | 2/2011 | Gum .............................. 709/222 |
| 2011/0235549 A1 | 9/2011 | Ahlers et al. |
| 2012/0311108 A1 | 12/2012 | Brandwine et al. |
| 2012/0314617 A1* | 12/2012 | Erichsen et al. .............. 370/254 |

OTHER PUBLICATIONS

Non-Final Office Action, U.S. Appl. No. 13/271,056, dated Mar. 11, 2013, 16 pages.

Final Office Action U.S. Appl. No. 13/271,056 dated Aug. 22, 2013, 15pages.

* cited by examiner

PROVIDING VIRTUALIZED VISIBILITY THROUGH ROUTERS

CROSS-REFERENCE TO RELATED APPLICATIONS

Cross-reference is made to a co-pending patent application by Wassim Haddad, et al. for "ARCHITECTURE FOR VIRTUALIZED HOME IP SERVICE DELIVERY" filed on the same date as the present application and commonly owned. The cross-referenced application is incorporated herein by reference.

FIELD OF THE INVENTION

The embodiments of the invention are related to the assignment of Internet Protocol version 6 (IPv6) addresses. Specifically, the embodiments of the invention relate to the assignment of IPv6 addresses to devices in a home network by a router such that the Internet service provider has visibility of the assigned IPv6 addresses at upstream routers.

BACKGROUND

Home networks are utilized to connect devices in the home to one another and to the Internet. These home networks are connected to residential Internet service providers via a device known as a Residential Gateway (RGW). This device provides physical and protocol connectivity between the home network and the access network (i.e., the core network of the Internet service provider including the Internet service provider's access control devices such as a Broadband Remote Access Server (BRAS) router or Broadband Network Gateway (BNG)).

The RGW can provide bridging or routing support for the home network. It typically also provides additional services such as firewall protection and network address translation. The RGW can connect with the devices in the home using both wired and wireless protocols and connections. The RGW can provide a set of Ethernet connections as well as a wireless local area network using IEEE 802.11(a/b/g/n). The RGW can also be a point of service delivery for services such as Voice Over Internet Protocol (VOIP) or de-multiplexing for services like shared television delivery.

In some situations a home network can have more than one router attached. These additional routers form a hierarchy or tree with the RGW forming the base or root. While the preferred architecture is to avoid such routers, it is helpful for Internet service providers to have visibility for devices within such home network topologies when they are used. However, the addresses of devices connected to routers in these topologies is hidden due to the routers closest to the devices configuring the IP address for the device instead of the RGW.

SUMMARY

A method implemented by a network element of an Internet service provider to track Internet Protocol version 6 (IPv6) addresses of devices in a home network, wherein the network element provides dynamic host configuration protocol version 6 (DHCPv6) service to the home network and a home network router on the home network assigns IPv6 address to the devices using a prefix provided by the DHCPv6 service, the method comprising the steps of receiving a DHCPv6 request for a prefix delegation, by the network element, from a home network router including an indicator of support for IPv6 address assignment notice requests, sending a DHCPv6 message including an assigned prefix to the home network router, by the network element, the DHCP message including a request for notification of IPv6 addresses configured for the devices in the home network, receiving a first Internet Control Message Protocol (ICMP) message from the home network router, by the network element, the ICMP message including a media access control (MAC) address and corresponding IPv6 address for a configured device, and sending the home network router a second ICMP message by the network element, the ICMP message to acknowledge recording the IPv6 address for the configured device, enabling the network element to provide services and forward traffic directly to the configured device.

A network element of an Internet service provider to track Internet Protocol version 6 (IPv6) addresses of devices in a home network, wherein the network element provides dynamic host configuration protocol version 6 (DHCPv6) service to the home network and a home network router on the home network assigns IPv6 address to the devices using a prefix provided by the DHCPv6 service, the network element comprising a storage device to store a host IPv6 address table, a network processor coupled to the storage device, the network processor to execute an Internet Protocol service router to provide data plane services for an Internet service subscriber, the IP service router including a virtual gateway controller to provide the DHCPv6 service to home network routers in the home network, the DHCPv6 service to assign a prefix to a first home network router in response to receiving a DHCPv6 request for a prefix delegation from the first home network router including an indicator of support for IPv6 address assignment notice requests, wherein the DHCPv6 service sends a DHCPv6 message including the assigned prefix and a request for notification of IPv6 addresses configured for the devices in the home network, the DHCPv6 service of the virtual gateway to receive a first Internet Control Message Protocol (ICMP) message from the first home network router, the ICMP message including a media access control (MAC) address and corresponding IPv6 address for a configured device, the virtual gateway to record the IPv6 configuration in the host IPv6 address table and to send the first home network router a second ICMP message, the second ICMP message to acknowledge recording the IPv6 address for the configured device, enabling the IP service router to provide the data plane services to the configured device.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
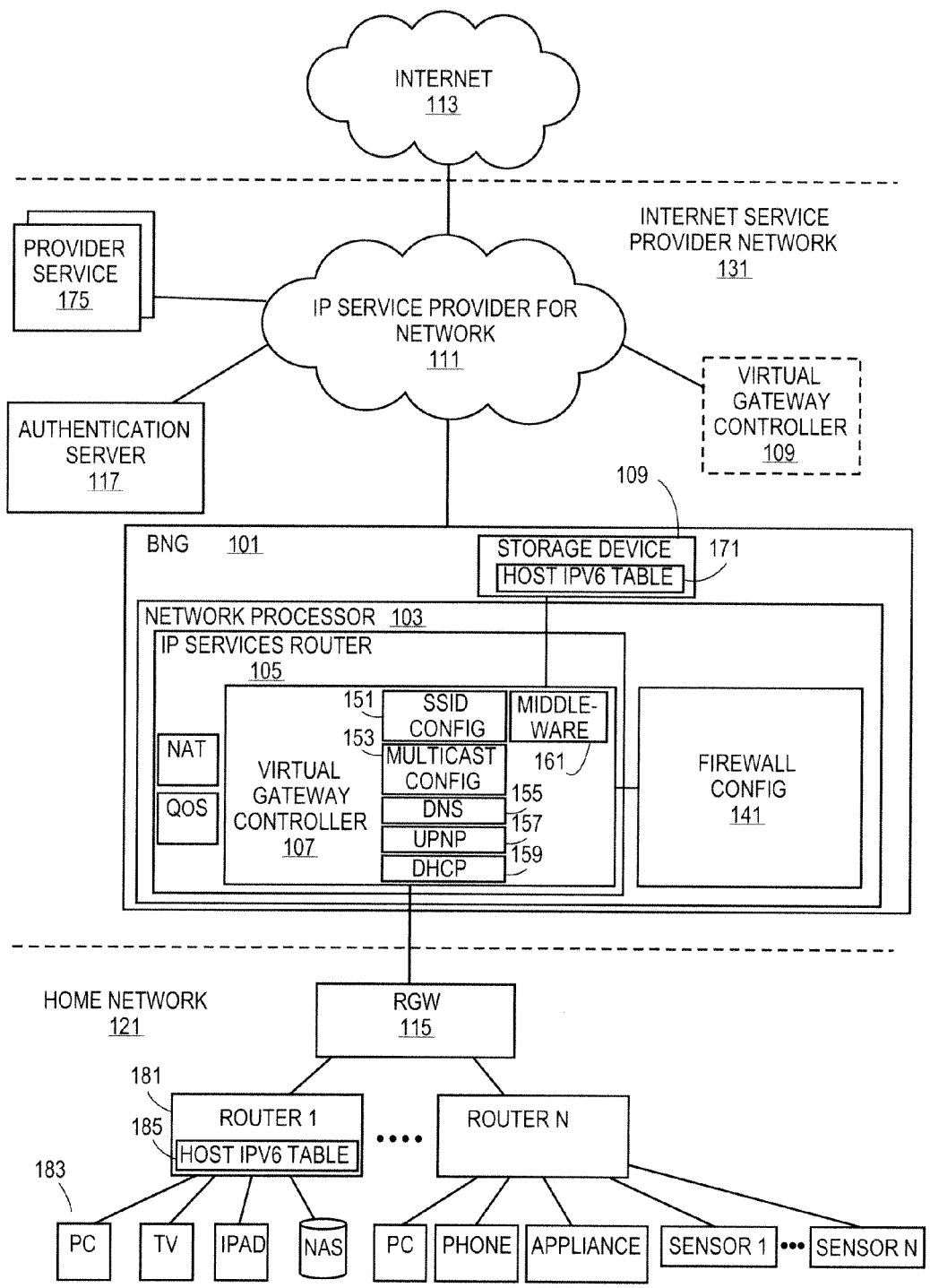
FIG. 1 is a diagram of one embodiment of network implementing virtualized visibility through routers.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 1 and 2. However, it should be understood that the operations of the flow diagrams in FIG. 3 can be performed by embodiments of the invention other than those discussed with reference to FIGS. 1 and 2, and the embodiments discussed with reference to FIGS. 1 and 2 can perform operations different than those discussed with reference to the flow diagram of FIG. 3.

The techniques shown in the figures can be implemented using code and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

The embodiments of the invention provide a method and system for avoiding the disadvantages of the prior art. As the needs of home networking have evolved, the demands placed on residential gateway have increased. Thus, the residential gateways have become more complex, error prone, and expensive. Also, to provide new features to customers of an Internet service provider or residential gateway purchaser, it is required that a software upgrade for the residential gateway be performed, which is something that many home users find to be a challenge. This can deter many home users from taking advantage of these new services.

The complexity of properly configuring the residential gateway and other in-home networked devices has increased to the point that many users have serious difficulties getting their home network and attached devices configured. This results in increased support costs for the Internet service providers and residential gateway manufacturers.

Even when the residential gateway has limited functionality, such as when the residential gateway functions simply as a bridge, if there are additional routers within the home network attached to the residential gateway, two significant difficulties arise. The first difficulty is that these additional routers need an Internet Protocol version 6 address prefix to use with the subnets (i.e., their own local area networks (LANs)) that they support. The second difficulty is that such routers completely hide any devices on their supported LANs from the upstream routers and the service provider. This makes it difficult for the service provider to provide or monitor certain services to these hidden devices.

The embodiments of the invention overcome these disadvantages of the prior art. Instead of using a complex residential gateway with many software functions configured by the home user, the embodiments of the invention use a simple residential gateway device which defers all complex processing to the Internet service provider, at an upstream device such as a Broadband Remote Access Server (BRAS) or Broadband Network Gateway (BNG), or other upstream service delivery platform. The embodiments of the invention encompass an architecture and components for delivering this service. The upstream service delivery platform executes a set of control logic functioning as a virtual residential gateway, which provides the services the subscriber wants from the network of the Internet service provider, including leveraging the rest of the Internet for services. The control logic controls both the upstream service delivery platform and the residential gateway.

The network architecture allows sufficient visibility into the home network that the Internet service provider can provide services transparently, as if they were delivered by devices in the home. Instead of configuring individual devices, the home user has a web interface which provides full control over his network environment in a way that is natural and easy to use, as it integrates all of his equipment and provides a common, well structured, access to the service view, rather than needing to worry about how to configure each device. Service upgrades then become a matter of a request on the web page; the Internet service provider can then modify the configuration that is applied to that home network. In addition, by having virtualized the residential gateway, the same set of services can be provided to users in other locations. Appropriately authenticated remote access to the home network then becomes a natural part of the overall network architecture.

The provision of services to devices in networks with virtual gateway controllers is affected by address assignment when the in-home routers rely on the use of dynamic host configuration protocol version 6 (DHCPv6) with prefix delegation. The DHCPv6 with prefix delegation provides the in-home routers with configuration information and a set of prefixes to use for devices on the LANs that they support. Prefix delegation is the assignment of a range of IPv6 addresses with a shared prefix (i.e., a leading set of numbers), for example 2001:0db8:85a3:0000:0000:8a2e:0370:xxxx, where xxxx denotes the assignable address range.

In order to give the Internet service provider visibility to the end-devices on the home network, there is an additional flag and an additional behavior incorporated into DHCPv6. The additional behavior is that whenever a router in the home network detects that a new device is present on local LAN of the router, that router sends a notification to the virtual residential controller at the BNG or BRAS. In order to trigger such notifications, there is a flag included in the DHCPv6 address delegation message indicating that these notifications are needed. For consistency, there is also a flag in the DHCPv6 prefix request message indicating that the router is capable of this behavior.

FIG. 1 is a diagram of one embodiment of the network architecture using a virtual residential gateway and supporting virtualized visibility for residential routers. The implementation of the virtualized visibility is divided amongst three primary components, and several related items. The three primary components are the residential gateway (RGW) 115, the upstream IP Service router 105 (i.e., in a BNG 101, BRAS or equivalent), and the virtual gateway controller 107.

A BNG 101 is an IP edge router where bandwidth and Quality of Service (QoS) policies are applied; the functions performed by a BRAS are a superset of those performed by a BNG. A BRAS is a BNG 101 and is the aggregation point for the subscriber traffic. It provides aggregation capabilities (e.g. IP, PPP, Ethernet) between the access network and the core network 111 of the Internet service provider 131. Beyond its aggregation function, the BRAS is also an injection point for policy management and IP QoS in the access network. For sake of clarity, the example of a network using a BNG 101 to implement the IP services router 105 is provided. However, one skilled in the art would understand that a BRAS or similar device could also be used. An Internet service provider network 131 with a single BNG 101 and RGW 115 is also illustrated for sake of clarity. One skilled in the art would understand that a BNG 101 can connect any number of home networks 121 and RGWs 115 to the core network 111 as well as to the general Internet 113. Also, the Internet service provider 131 can include any number of BNG 101 and BRAS or similar devices to connect to the set of home networks 121 and RGWs 115.

A virtual gateway controller 107 can be implemented in multiple fashions. The virtual gateway controller 107 can be part of the control plane of the IP services router 103, which is executed by a network processor 103 of a BNG or similar device. The virtual gateway controller 107 can be delivered on a blade in the chassis of the IP services router 105 (e.g., in a BNG 101), or it can be a separate device 109 connected via network protocols (IP) to the IP services router 107. This device is responsible for maintaining the subscribers' virtual operation state. This includes determining the operational state of all data plane functions. This means both modeling the state and configuring the appropriate devices such as the RGW 10 and BNG 101 to deliver the behavior needed.

Thus, the virtual gateway controller 107 is responsible for configuring firewall functions 141 on the BNG 101. It is responsible for configuring SSIDs 151 and their policies for wireless access on the RGW 115. It is responsible for managing multicast filters 153 on both devices so as to provide needed connectivity while reducing unnecessary traffic. The virtual gateway controller 107 can also provide house control functions such as a UPnP controller 157. It can provide supporting services such as creating DNS entries 155. The operation of the virtual gateway controller is tied in to the existing authorization infrastructure 117 used by the Internet service provider (e.g., RADIUS and/or Diameter.) This enables additional authorization operations, such as those needed for Fixed-Mobile Convergence, or for support of SIM based residential gateways.

The IP services router 105 is the router which delivers data plane services for the subscriber. It handles all subscriber data plane packets. It performs many of the functions, such as network address translation (NAT) and firewall functions, which are functions that are traditionally delivered by the RGW 115. The operation of these functions is controlled by the virtual gateway controller 107. This device also performs data plane functions such as traffic policing and QoS delivery, which are currently delivered on such platforms. However, in this embodiment the operation of such functions is under the control of the virtual gateway controller, although per-subscriber base operations can be delegated to the IP services router 105. The IP services router 105 or a suitable controller for this device, participates in the IP routing of the operator's IP network, and is able to send and receive traffic on behalf of the subscriber.

The residential gateway 115 provides the physical connectivity between the various media in the home (Ethernet, 802.11 b/g/n Wifi, Zigbee, and similar media) and connectivity to the service provider (DSL, Cable, Passive Optical, LTE, and similar technologies). The residential gateway 115 provides enough logical operation that it can provide packet communication between the devices in the home and the IP service providers network. This device can be owned by either the subscriber or the operator. However, it is controlled by the virtual gateway controller 107 managed by the operator.

Other devices in the home network 121 can use protocols that interact with the virtual gateway controller. In general, this interaction is unchanged within the home network device; however the shift of the functionality from the RGW to the virtual gateway controller improves the manageability and effectiveness of operation. For example, a device on the home network 121 can use universal plug and play protocol (UPnP) 157 to reach the virtual gateway controller or to discover a storage service on the home network 121, which previously was entirely implemented within the home network 121. With the use of the virtual gateway controller, UPnP 157 and other services including the domain name service 155, DHCP 159, SSID configuration 151, multicast configuration 153 and similar services appear to be implemented in the home network 121 or at the RGW, but are actually deliverable by the Internet service operator from BNG 101 through the virtual gateway controller 107 or similar devices in the Internet service provider network 131. The use of the split architecture where the control plane of the virtual gateway controller is separated from the data plane of the RGW makes the services of the Internet service provider network 131 appear easily discoverable and transparently accessible to the user. Such services can include voice-over-IP (VOIP) enablement services, storage services, or application services. Similarly, access to the home network 121 and home network based services can be more easily provided to users when they are accessing the home network from other networks using additional software for authentication and association, such as an authentication server 117 provided by the Internet service provider.

There are two primary concepts involved in the control operation of the virtual gateway controller 107. The first is the control protocol by which the virtual gateway controller 107 controls the functions of the BNG 101 and RGW 115. This first control protocol can be a protocol such as a modification of the ForCES protocol standardized by the International Engineering Task Force (IETF). The ForCES protocol can be enhanced to represent the needed functions. Other protocols, including traditional network management protocols such as simple network management protocol (SNMP) or NETConf or even computer usage of web-based interactions can be used for this control.

The second primary concept involved in the control operation of the virtual gateway controller 107 is the control protocol by which the virtual gateway controller can be the controlling element for network operation protocols such as DHCP, IPv6 Neighbor Discovery, and UPnP discovery mechanisms.

In some home networks 121, there will be routers 181 that are separate from the residential gateway within the home network 121. These routers 181 can be configured to use DHCPv6 to receive an IPv6 prefix to use for host (i.e., end devices 183) that they are supporting. The additional home network routers 181 that support virtualized visibility will indicate this support by including a flag in their DHCPv6 request message that is sent to the RGW 115 and then forwarded to the virtual gateway controller 107 on the BNG 101. The virtual gateway controller 107 provides DHCPv6 services 159. When responding to routers, which have indicated that they support the virtualized visibility, the virtual gateway controller 107 will set a flag indicating that addresses assigned to new hosts 183 shall be reported to the virtual gateway controller 107 as they are discovered.

The home network routers 181 supporting the virtualized visibility will monitor and maintain state about hosts 183 that are attached to the home network routers 181 on their LANs. The LANs provided by these home network routers 181 can be any combination of wired and wireless LANs. Each router 181 will support virtualized visibility by monitoring IPv6 neighbor discovery requests and IPv6 DHCPv6 requests that they relay. When a new host 183 is discovered, a notification message is sent by the router 181 to the virtual gateway controller 107. When a host 183 is deemed no longer present, a notification is again sent to the virtual gateway controller 107. The virtual gateway controller 107 responds to these notifications with acknowledgement messages. In one embodiment, the notifications are resent until the acknowledgment is received. These messages can be sent using ICMP or other control protocol. In other embodiments UDP or a protocol over a TCP connection to the virtual gateway controller could be used. Whenever such a message is sent, all unacknowledged information can be included in the message for efficiency.

Host removal can be detected when stateless address autoconfiguration (SLAAC) is used by having a revalidation time and a lifetime on the entries that the home network router stores about its hosts. This information can be stored in a host IPv6 table 185 or similar data structure. When the revalidation time is reached, the home network router 181 will send IPv6 neighbor solicitation messages to verify the continued existence of the host 183 on the LAN and then will set new time limits. In the event that the host 183 fails to respond, the home network router 181 will resend the message. After several retransmissions of the message, the router 181 will declare the host 183 removed, and will notify the virtual gateway controller 107. The virtual gateway controller 107 can track the hosts 183 in a home network in a host IPv6 table 109. A separate instance of the table can be maintained for each connected home network or assigned prefix.

If a home network router supports other mediums of communications with other host notification protocols, such as 6LowPan, then the procedures from those media can be used to detect the presence of hosts 183 and determine the information needed for the registration with the virtual gateway controller 107. The hosts 183 can be any type of networked device such as personal computers, televisions, handheld devices such as tablet computers and cellular phones, network storage devices, appliances and similar devices. In one embodiment, the home network 121 can also support machine to machine communication. Machine to machine communication can be used to collect data from a set of sensors connected to the home network router 181. Middleware 161 that communicates with sensors and devices using machine to machine communication is typically executed by a residential gateway, but can also be moved to the virtual gateway controller.

This network architecture provides a coherent system for a virtualized residential gateway and virtualized home service delivery. The configuration, enhancement, and consistent remote service and remote access to home information and resources all become natural parts of a coherent architecture. An important advantage of this architecture is to provide the operator enough visibility to all devices connected to the residential gateway in the home network 121. This enables the Internet service provider to provide different (seamless) services to the home, e.g., network management, service delivery, and similar services. Another advantage is to enable the Internet service provider to assist 3rd parties, e.g., utility providers or appliance manufacturers, in accessing the right devices through the home network 121. For example, an electric utility company may need to access the home network 121 to configure the thermostat or switch on/off a particular device in the electrical system of the home. In one embodiment, this can be done through the machine to machine middleware 161 or an instance thereof.

Figure 2:
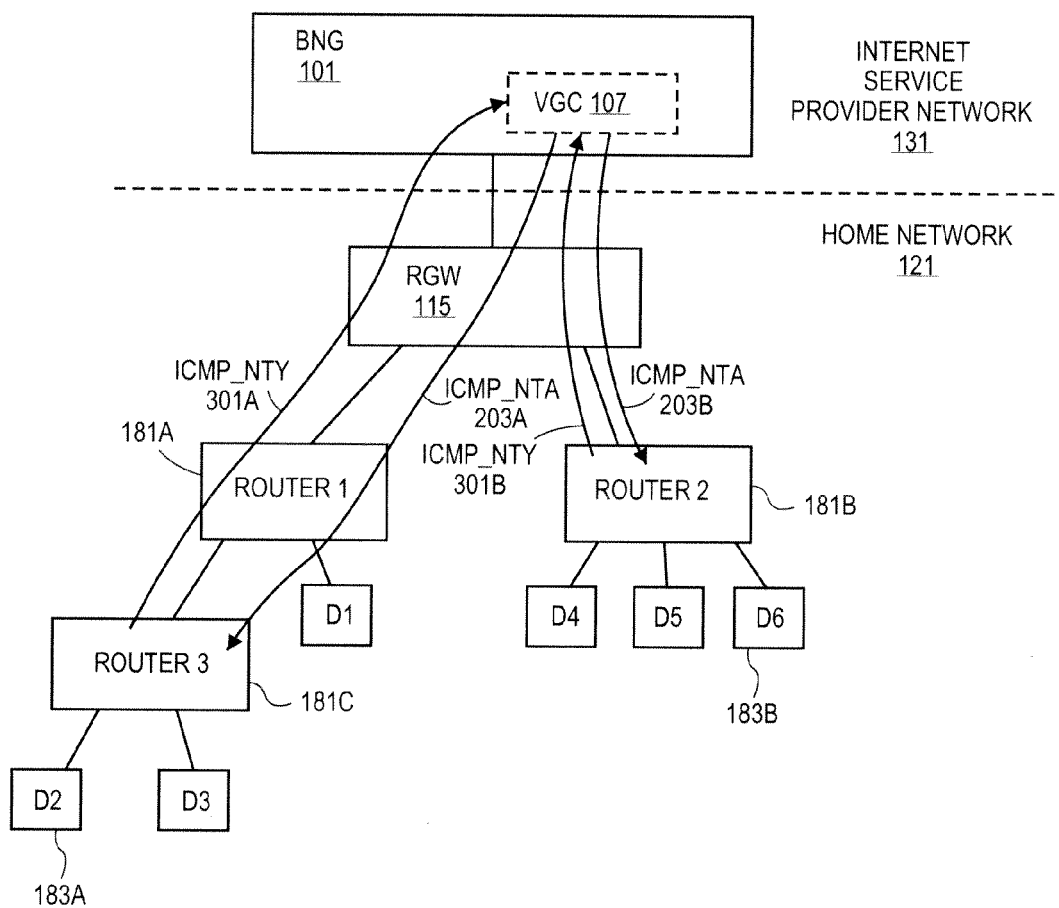
FIG. 2 is a diagram of one embodiment of messaging between home network routers and a virtual gateway controller.

FIG. 2 is a diagram of one embodiment of messaging between home network routers and a virtual gateway controller. In the example embodiment, the home network 121 is connected to a BNG 101 providing a virtual gateway controller (VGC) 107. In other embodiments, the virtual gateway controller 107 can be located external to the BNG 101 within the Internet service provider network 131. The home network 121 includes a residential gateway (RGW) 115 and a set of home network routers 181A-C. The home network routers 181A and 181C are in a nested or cascaded configuration. This creates multiple levels of indirection between the VGS 107, which provides DHCP services for the home network 121 and the host (i.e., end devices), such as host 183A. The diagram provides an example of the host 183A being discovered by the home network router 181C.

In this example, the home network router 181C has already been provided with a prefix by the DHCP services of the VGC 107 indirectly through a DHCPv6 prefix request sent to the intermediate home network router 181A. The DHCPv6 prefix request included a flag or similar indicator of the support for virtualized visibility. This DHCPv6 prefix request was forwarded by the intermediate router 181A, which then forwarded it to the VGC over the RGW, which in this architecture as described above, functions as a bridge. The VGC then responded with the assigned prefix or a subset of the prefix assigned to the intermediate home network router 181A using a DHCPv6 message indicated that notifications were required for discovered hosts. The intermediate home network router 181A then recorded this address range or prefix and forwarded the message to the requesting home network router 181C.

The host 183A can be discovered using any type of neighbor discovery protocol. Once discovered, the home network router 181C provides the host 183A with an IPv6 address based upon the prefix assigned to the router 181C by the DHCPv6 service of the VGC 107. However, this newly assigned IPv6 address would be unknown to the VGC 107, except that the VGC 107 has required notifications of new host discovery. The notification can be in the form of an ICMP message or similar type of control protocol message. In one embodiment, the home network router generates a notification message referred to as an ICMP_NTY message 201A. The ICMP_NTY message 201A can include the assigned IPv6 address for the host 183A, a MAC address for the host 183A, lifetime or license expiration data and similar information to enable the VGC 107 to track the host 183A. The intermediate home network router 181A and the VGC 107 record this information in the host IPv6 tables.

The VGC 107 then generates an acknowledgement message. The acknowledgement message can be an ICMP message. The ICMP message can be a notification acknowledgement message referred to herein as an ICMP_NTA message 203A. The ICMP_NTA message 203A is sent to the intermediate home network router 181A where it is forwarded to the home network router 181C. The home network router 181C would continue to resend the ICMP_NTY message 201A until the ICMP_NTA message 203A is received in return.

Similarly, a simpler scenario is provided where a third home network router 181B discovers a host 183B. In this case, the same type of ICMP_NTY 201B and ICMP_NTA 203B messages are exchanged by the home network router 181B and the VGC 107 without the involvement of any intermediate router. The process of notification thus can involve any number of home network routers in any arrangement including any hierarchical depth of cascading routers.

Figure 3:
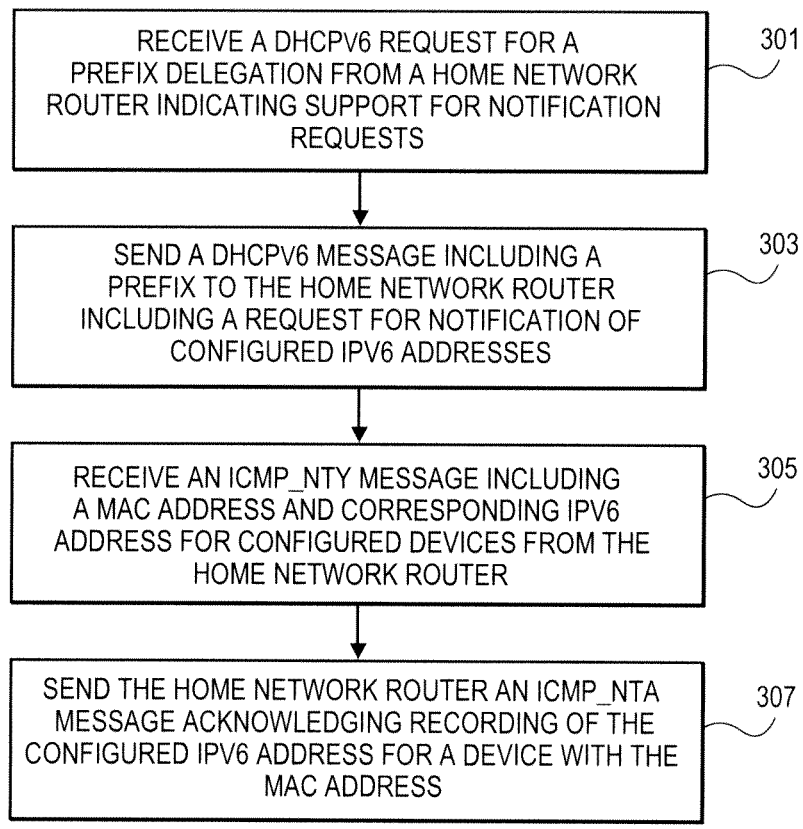
FIG. 3 is a flowchart of one embodiment of a process for enabling virtualized visibility through residential routers.

FIG. 3 is a flowchart of one embodiment of a process for enabling virtualized visibility through residential routers. The illustrated process sets forth the actions taken by the virtual gateway controller to implement the virtualized visibility system. In one embodiment, the process is initiated in response to receiving a DHCPv6 request for a prefix delegation from a home network router (Block 301). The request can include an indicator such as a flag or set field that denotes the support for the virtualized visibility system.

The VGC responds to the received request by sending a DHCPv6 message including an assigned prefix to the home network router (Block 303). The response message can include an indicator in the form of a flag or a set field that indicates that notifications of host discovery or IPv6 address configuration are required to be reported to the VGC. This message can be sent to the requesting home network router through the residential gateway and any number of intermediate home network routers.

The process can further receive an ICMP_NTY notification message from the home network router at any time, in response to the home network router discovering a host and configuring an IPv6 address for the host (Block 305). The ICMP_NTY message can include the IPv6 address of the host, a MAC address for the host, a lifetime or license expiration and similar information about the host IPv6 configuration. This information can be recorded in a host IPv6 table to facilitate data plane forwarding and service provision to the host. The VGC then generates and sends an ICMP_NTA message to the home network router (Block 307). The ICMP_NTA message acknowledges receipt and recording of the data from the ICMP_NTA message including the IPv6 address and MAC address for the host.

Figure 4:
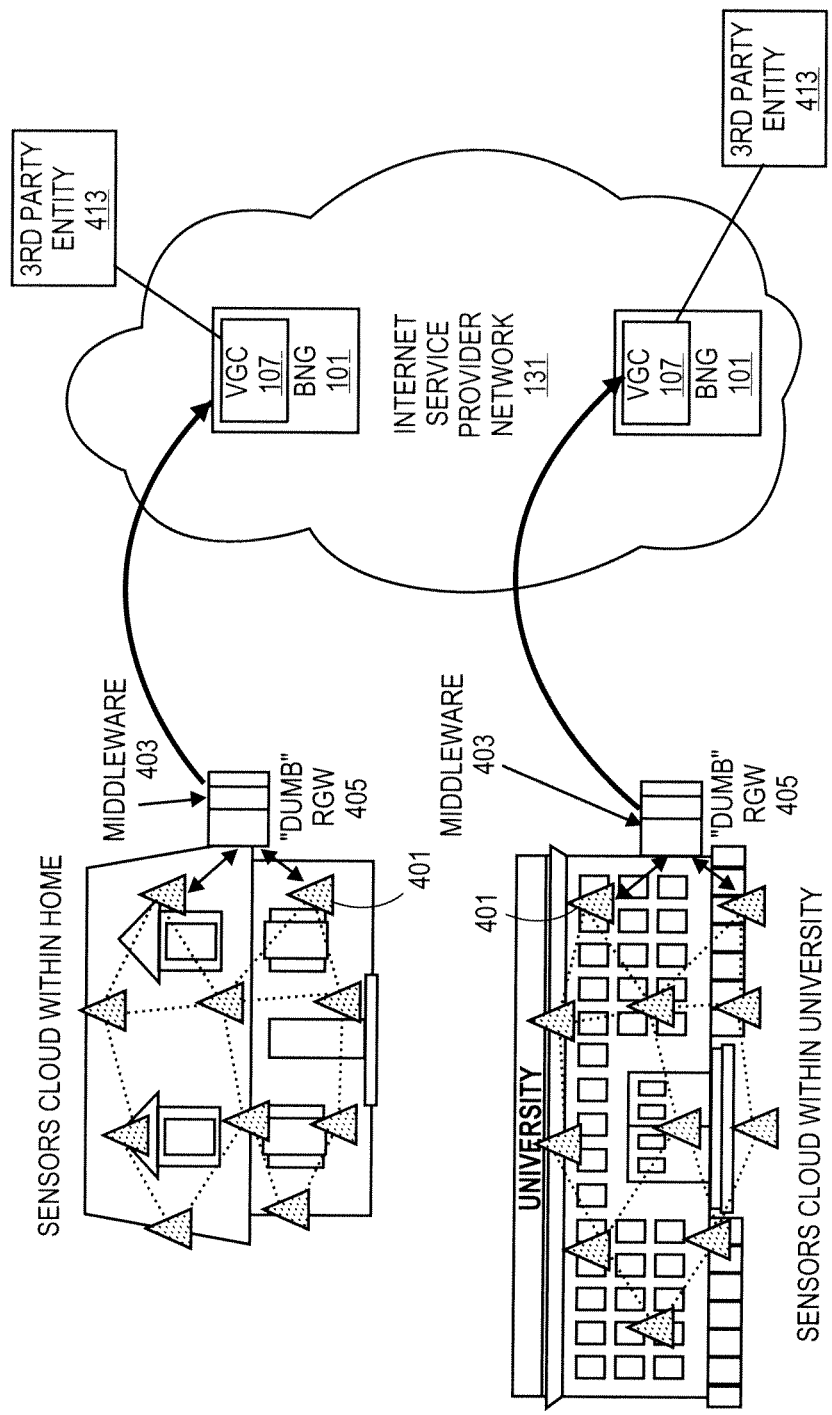
FIG. 4 is a diagram of one embodiment of the architecture for a machine to machine system interfacing a virtual gateway controller.

FIG. 4 is a diagram of one embodiment of the architecture for a machine to machine system interfacing a virtual gateway controller. In one embodiment, the virtual gateway controller 107 includes or supports the middleware 403 that enables communication or collects data from sensors 401 within a home using machine to machine communication or a machine to machine communication network. The middleware 403 that had traditionally been executed by the residential gateway 405 has been moved to the virtual gateway controller 107. The process for visibility and the general function of the network as described above can also be applied to support these machine to machine networks with a virtual gateway controller taking the place of the function of the RGW in these systems.

The middleware 405 can continue to communicate with third party entities 413. This function is enhanced in terms of security and flexibility with the virtual gateway controller 107. The virtual gateway controller 107 can provide access to the middleware 405 and thereby the sensor network in the home without giving the third party entities actual access to the home network or RGW. Separate instances of the middleware 405 can be provided for separate third party accesses.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented by a network element of an Internet service provider to track Internet Protocol version 6 (IPv6) addresses of devices in a home network, wherein the network element provides dynamic host configuration protocol version 6 (DHCPv6) service to the home network and a home network router on the home network assigns IPv6 address to the devices using a prefix provided by the DHCPv6 service, the method comprising the steps of:

receiving a DHCPv6 request for a prefix delegation, by the network element, from the home network router including an indicator of support for IPv6 address assignment notice requests;

sending a DHCPv6 message including an assigned prefix to the home network router, by the network element, the DHCPv6 message including a request for notification of IPv6 addresses assigned to the devices in the home network;

receiving a first Internet Control Message Protocol (ICMP) message from the home network router, by the network element, the first ICMP message including a media access control (MAC) address and corresponding IPv6 address assigned for a configured device in the home network, the first ICMP message functioning as an IPv6 address assignment notice; and sending the home network router a second ICMP message by the network element, the second ICMP message to acknowledge recording the IPv6 address assigned for the configured device, the second ICMP message functioning as an IPv6 address recording acknowledgement message, enabling the network element to provide services and forward traffic directly to the configured device, in the home network.

2. The method of claim 1, wherein the first ICMP message is received by the network element from a residential gateway functioning as a bridge between the Internet service provider network and the home network.

3. The method of claim 1, wherein the first ICMP message is received by the network element after being forwarded by another home network router between the home network router and the network element.

4. The method of claim 1, wherein the MAC address received from the home network router is determined by the home network router using a duplicate address detection process.

5. The method of claim 1, wherein the first ICMP message includes a lifetime or a revalidation time for the configured device to enable detection by the network element of disconnection of the configured device from the home network.

6. A network element of an Internet service provider to track Internet Protocol version 6 (IPv6) addresses of devices in a home network, wherein the network element provides dynamic host configuration protocol version 6 (DHCPv6) service to the home network and a home network router on the home network assigns IPv6 address to the devices using a prefix provided by the DHCPv6 service, the network element comprising:
  a storage device to store a host IPv6 address table;
  a network processor coupled to the storage device, the network processor to execute an Internet Protocol service router to provide data plane services for an Internet service subscriber, the IP service router including a virtual gateway controller to provide the DHCPv6 service to the home network router in the home network, the DHCPv6 service to assign a prefix to the home network router in response to receiving a DHCPv6 request for a prefix delegation from the home network router including an indicator of support for IPv6 address assignment notice requests, wherein the DHCPv6 service sends a DHCPv6 message including the assigned prefix and a request for notification of IPv6 addresses assigned to the devices in the home network, the DHCPv6 service of the virtual gateway to receive a first Internet Control Message Protocol (ICMP) message from the home network router, the first ICMP message including a media access control (MAC) address and corresponding IPv6 address assigned for a configured device in the home network, the first ICMP message functioning as an IPv6 address assignment notice, the virtual gateway to record the IPv6 configuration in the host IPv6 address table and to send the home network router a second ICMP message, the second ICMP message to acknowledge recording the IPv6 address assigned for the configured device, the second ICMP message functioning as an IPv6 address recording acknowledgement message, enabling the IP service router to provide the data plane services to the configured device in the home network.

7. The network element of claim 6, wherein the first ICMP message is received by the virtual gateway from a residential gateway functioning as a bridge between the Internet service provider network and the home network.

8. The network element of claim 6, wherein the first ICMP message is received by the virtual gateway after being forwarded by another home network router between the home network router and the network element.

9. The network element of claim 6, wherein the MAC address received from the home network router is determined by the home network router using a duplicate address detection process.

10. The network element of claim 6, wherein the first ICMP message includes a lifetime or a revalidation time for the configured device to enable detection by the network element of disconnection of the configured device from the home network.

* * * * *

UNITED STATES PATENT AND TRADEMARK OFFICE
CERTIFICATE OF CORRECTION

| | | |
|---|---|---|
| PATENT NO. | : 8,751,614 B2 | Page 1 of 1 |
| APPLICATION NO. | : 13/271047 | |
| DATED | : June 10, 2014 | |
| INVENTOR(S) | : Haddad et al. | |

It is certified that error appears in the above-identified patent and that said Letters Patent is hereby corrected as shown below:

On the title page, under Item "Assistant Examiner", in Column 2, Line 1, delete "Don Zhoa" and insert -- Don Zhao --, therefor.

In the Specification

In Column 8, Lines 44, delete "VGS" and insert -- VGC --, therefor.

Signed and Sealed this
Twenty-eighth Day of October, 2014

Michelle K. Lee
*Deputy Director of the United States Patent and Trademark Office*